United States Patent [19]

Grimmer

[11] Patent Number: 5,525,284
[45] Date of Patent: Jun. 11, 1996

[54] PROCESS FOR MANUFACTURING PLASTIC PARTS

[75] Inventor: Robert A. Grimmer, Berwick, Me.

[73] Assignee: Davidson Textron Inc., Dover, N.H.

[21] Appl. No.: 450,906

[22] Filed: May 26, 1995

Related U.S. Application Data

[62] Division of Ser. No. 267,252, Jun. 29, 1994.

[51] Int. Cl.⁶ .............................. B29C 41/02; B29C 4/18
[52] U.S. Cl. .................... 264/301; 264/302; 264/310; 264/311
[58] Field of Search ............... 264/13–15, 140–143, 264/302, 310, 311, 301

[56] References Cited

U.S. PATENT DOCUMENTS

| | | | |
|---|---|---|---|
| 2,862,243 | 12/1958 | Farr et al. | |
| 2,918,701 | 12/1959 | Hull et al. | |
| 3,042,970 | 7/1962 | Ternzi | |
| 3,060,510 | 10/1962 | Fischer et al. | |
| 3,207,818 | 9/1965 | Marshall | |
| 4,167,382 | 9/1979 | Freedman et al. | |
| 4,389,177 | 6/1983 | Colby | |
| 4,621,995 | 11/1986 | Wersosky | 425/144 |
| 4,623,503 | 11/1986 | Anestis et al. | 264/302 |
| 4,722,678 | 2/1988 | Wersosky | 425/145 |
| 4,767,299 | 8/1988 | Friesen | |
| 4,878,827 | 11/1989 | Muller | 425/434 |
| 4,923,657 | 5/1990 | Gembinski et al. | |
| 4,979,888 | 12/1990 | Bauer et al. | 425/174.4 |
| 5,106,285 | 4/1992 | Preston | 425/144 |
| 5,124,090 | 6/1992 | Shimizu et al. | |
| 5,244,984 | 9/1993 | Suzuki | |

*Primary Examiner*—Karen Aftergut
*Attorney, Agent, or Firm*—Reising, Ethington, Barnard & Perry

[57] ABSTRACT

Spherical particles having a diameter between 0.007" and 0.040" are formed from melt extruded thermoplastic material suitable for casting on a heated mold surface and melting thereon to form a thin layer of material that is cooled and removed from the mold surface as a part having a porosity less than a visually observable threshold. The process includes the steps of providing microspheres formed of blended and melt extruded thermoplastic, plasticizers (if necessary) and pigment additives that constitute less than 5% by weight of the blend and shaped as a smooth round spherical particle. The microspheres may then be distributed as a predetermined charge of such microspheres against the heated casting surface to melt the microspheres as a layer of thermoplastic material having a porosity less than 0.003 inches and thereafter cooling and removing the non-porous layer from the casting surface.

4 Claims, 1 Drawing Sheet

PROCESS FOR MANUFACTURING PLASTIC PARTS

This is a division, of application Ser. No. 08/267,252, filed on Jun. 29, 1994.

TECHNICAL FIELD

This invention relates generally to thin plastic shells or skins and more particularly to materials for and methods for manufacturing such thin plastic shells by casting thermoplastic particles against the casting surface of a heated mold so as to melt flow and later cool the material into a thin layer part.

BACKGROUND OF THE INVENTION

U.S. Pat. No. 4,923,657 discloses a powder casting process in which pigmented plastic particles of thermoplastic material are deposited on a heated surface to form a thin plastic shell or skin. While suitable for its intended purpose, the process disclosed in the '657 patent uses thermoplastic particles having dimensions in the range of 0.002" to 0.016". The particles disclosed in the '657 patent disclosure were virgin polyvinyl chloride resin; plasticizers; stabilizers and pigments blended together in a high intensity mixer. A typical high intensity mixer is nothing more than a heavy duty household type mixing blender. The blender operates at a speed that will cause frictional heating of the resin. In such processes the virgin PVC resin started with a particle having a diameter between 120 to 140 microns. The PVC particle is malleable and has microscopic cracks or fissures that are observable on the surface of the particles. In fact, because the particles are made during the polymerization process, they are found to be formed of ever smaller round particles that are full of passages into which the plasticizers and additives can wick during high intensity blending. Initially, during blending in the high intensity mixer, approximately 50% of the blending plasticizer is added to the mixer. After high intensity mixing, the PVC resin particle softens and swells to a diameter of 180 to 355 microns. In a typical high intensity mixing process the temperature of the material increases from ambient to approximately 180° F. At this temperature the PVC particles can absorb higher concentrations of plasticizers and additives. Since pigments and stabilizers are the most difficult constituents to fully disperse into the resin particle, they are usually the last to be added during a typical compounding cycle. Once they are added the compounding temperature is raised to the peak temperature below which the PVC resin particle will not melt so as to form particle agglomerates. The maximum mix temperature is dependent upon the molecular weight of the PVC and the type of plasticizer that is used. But in all cases, the characteristic of particles formed by high intensity mixer compounding the resin particle continues to soften and grow in size as the plasticizers and additives are absorbed or diffused into the resin particle. After the peak temperature is reached (above which melting occurs) the blended material is transferred to a cooling vessel that is equipped with a large blade that rotates at a low speed, for example, 20 RPM, that stirs the compounded material over the cooling surfaces of the vessel without generating any additional frictional heat. As the compounded material cools, the resin particles begin to contract so as to hold the plasticizers and additives within the resin particles. Such particles generally are heat sensitive in use and under high temperature ambient conditions, e.g., plant temperatures greater than 80° F., the material softens and can become sticky making it difficult to use in roto-casting and other powder casting processes. The softened material becomes tacky and this in turn can lead to manufacturing problems including bridging between the particles, the presence of holes in skins cast from the material and difficulty in controlling the total weight of shells manufactured from such material. In some cases it has been necessary to refrigerate the material when ambient temperatures are elevated to avoid such problems.

Other problems arise since the individual particles formed by the high intensity mixer process have a roughened surface with fissures and cracks therein. Such materials often do not flow into tight corners found in many powder casting mold configurations. Other thermoplastic materials used in powder casting or slush molding of thin shell thermoplastic parts include material that is cryogenically ground. Such material can have a wide range of shapes and is also characterized by outer surface configurations that include cracks and fissures that are apparent to the eye or under magnifications less than 10 X.

Use of such irregularly shaped particles in processing that includes feeding the particles to a point of use and casting the particles on a heated mold to melt flow the particles and cool them to form thin plastic shells presents several other problems. In the case of slush molding, the particles are retained in a powder box that is rotated to direct an excess charge of material into a mold cavity. Such thermoplastic, irregular particles do not flow smoothly from all corners of a powder box. Furthermore, such particles do not smoothly flow into all parts of complex shaped molds of the type having tight return passages and very small mold surface features that simulate features such as leather grains, stitching or the like. As a result, it is necessary to vibrate the powder box and molds during the various processing steps so that the particles will flow against heated mold surfaces so as to melt and form a skin or shell shape corresponding to the shape of the heated mold surface. The irregular shape also produces an uneven build-up of material on the heated mold surface such that the particles do not melt and flow uniformly against the heated mold surface. As a consequence, the resultant cast part can have irregular backside build-up when the part is cooled and extracted from the mold surface. Such irregularities on the backside require that the nominal thickness of the part be larger than required for a given application which in turn takes more material than in the case of a part that has a uniform shape on its backside.

Further, it has been found that irregularly shaped particles define an extended surface area that tends to collect moisture so that the particles do not flow smoothly onto a casting surface from conventional powder box apparatus. This problem is especially pronounced in the case of hydrophilic thermostatic material such as thermoplastic urethane material (TPU). Additionally, moisture build-up on such irregularly shaped particles can cause variations in the thermal load on the casting surface so that the temperature of the casting surfaces require continual adjustment making it difficult to control the quality of the finished product. Additionally, moisture content in excess of 0.01% will create porosity during the casting sequence because the excess water will flash-vaporize when it comes in contact with the heated tool surface.

In the past, TPU has also been used in roto-casting thin plastic parts. In such case the TPU material can be manufactured in a clear flake form that is pigmented and then cryogenically ground into a powder form. The powder is very fine and has an irregular, very coarse outer surface with cracks and fissures that define a high surface area that will hold moisture. Such moisture content will vary in the irregularly shaped materials causing the TPU particles to collect in hoppers and other handling material prior to use in a melt molding process in which the thermoplastic material is placed on the heated surface of a shaping mold. In the case of roto-casting the material is a fixed weight charge corresponding more or less to the weight of the finished product. In such processes the charge is selected to correspond to the weight of the finished part and the charge is continuously centrifuged against the mold surface to be melted and flowed to form the thin walled part. Examples of such roto-casting processes and methods are set forth in U.S. Pat. Nos. 4,167,382 and 4,767,299. In the past, irregularly shaped particles used in roto-casting were cryogenically ground from thermoplastic materials such as TPU or were formed by polymerizing polyvinyl chloride.

Pigment microspheres are also known. They can be added to resin particles in a hopper and mixed in the extruder of an injection molding machine to impart color to the resin particles. Such pigment microspheres are comprised primarily of pigment material in a binder of clear polyethylene. In such cases the pigment comprises 50% of the total weight of each of the pigment microspheres. Such pigment particles are added to polymeric material such as PVC and alloys of PVC and mixed therewith in mixers prior to injection into injection molding equipment. Typically, such pigment microspheres have been sold in a size range of 0.040 to 0.080 inches. They are suitable for use with virtually all thermoplastics used for injection molding including polyvinyl chloride, polyethylene, polypropylene, nylon, ABS, polyesters, elastomers and the like and, while suitable for their intended purpose of adding coloring to injection molded parts, have not been suggested for use in various roto-casting or slush molding processes and have not been suitable for such purpose since the microsphere has been comprised of mostly pigment material in a small amount of binder that will not provide desired melting and flow characteristics if used in powder casting processes such as roto-casting or slush molding.

Additionally, it is known to form thermoplastic pellets having a spheroidal shape that are added to other materials in an extruder upstream of injection molding apparatus. Since such particles are mixed and melted with other materials (such as pigment particles) in the extruder they come in a size range of 0.030" and greater. While suitable for use in charging an extruder for use in an injection molding process, such sized particles have not been found suitable for use in powder casting processes such as roto-casting or slush molding since they are too large for molds having tight returns and small dimensioned mold features.

SUMMARY OF THE INVENTION

In accordance with one aspect of the invention, a thermoplastic microsphere is provided for use in roto-casting or slush molding that solves the problem of moisture retention and poor flowability of materials for casting thin plastic shells on a heated mold surface. The thermoplastic microsphere is formed of blended thermoplastic resin and pigment that constitute less than 5% by weight of the blend; the microsphere is spheroidal and has an outer diameter in the range of 0.007" to 0.040" and has a surface that appears smooth up to magnifications of 80 X.

One embodiment of the process of the present invention includes providing a predetermined charge of material made up of microspheres having an outer diameter in the range of 0.007" to 0.040" and processing thin shells in the range of from 0.020" to 0.050" from such microspheres by either roto-casting including placing a charge corresponding to the weight of the finished product in a closed hollow heated mold and centrifugally and melt flowing the material into a shape corresponding to the heated mold surface; thereafter cooling the centrifugally molded part and removing it from the closed hollow heated mold or providing such material and slush molding a charge of material larger than the weight of the part to be cast in a powder box; joining the powder box to a mold having a cavity; rotating the powder box to fill the mold cavity with a charge of material that imposes a static head on the material that rests on the heated casting surface of the mold cavity; melting the material resting on the heated casting surface and flowing it against the heated casting surface; dumping excess material from the mold cavity; cooling the thin build-up of material on the casting surface and thereafter removing the finished part from the mold cavity.

In accordance with another aspect of the invention, the thermoplastic microsphere is formed in a continuous process that includes extruding thermoplastic urethane material and flaking the TPU into flakes 1/8"×3/8"; adding pigment; melting the resultant mixture and directing it in the molten state and cutting it into particles that are cooled in a water chamber to cause the particles to be shaped into microspheres having an outer diameter in the range of 0.007" to 0.040" and an outer surface that appears smooth up to a magnification of 80 X.

Still another aspect of the present invention is to use polyvinyl chloride material including pure PVC and alloys with PVC as the starter material and mixing it with pigment; melting the resultant mixture and directing it in the molten state and cutting it into particles that are cooled in a water chamber to cause the particles to be shaped into microspheres having an outer diameter in the range of 0.007" to 0.040" and an outer surface that appears smooth up to a magnification of 80 X.

Still another aspect of the present invention is to use TPU as the starter material wherein the TPU is mixed with pigment; melting the resultant mixture and directing it in the molten state and cutting it into particles that are cooled in a water chamber to cause the particles to be shaped into microspheres having an outer diameter in the range of 0.007" to 0.040" and an outer surface that appears smooth up to a magnification of 80 X.

Still another aspect of the present invention is to use a thermoplastic starting material selected from the group comprising polyurethane; polypropylene; polyethylene; polystyrene; epoxies or alloys of such materials; mixing such thermoplastic material with suitable plasticizers (if required) and additives; melt extruding the resultant mixture through an extrusion die having a diameter in the range of 0.007" to 0.040" and directing the extrusion stream as molten material through a cutter for forming particles and then cooling the particles in a water chamber so as to form microspheres having diameters in the range of 0.007" to 0.040".

A further feature of the present invention is to use any of the aforesaid starting materials with resins having a low molecular weight. For example, in the case of PVC from 50,000 to 150,000 M.W..

Another advantage of the present invention is that lower molecular weight resins in the microspheres will reduce the process temperatures and will decrease cycle time.

Still another advantage of the present invention is that such formation of such microspheres will lock the plasticizer component into the resin matrix material such that the resultant cast part can be formed with a uniform thickness without backside irregularities so as to improve shell weight control while reducing powder tackiness at higher summer time ambient conditions. Still another advantage of the invention is that it reduces the need for vibratory devices to maintain powder flow and as a consequence there is less tool wear which in turn increases tool life.

Still another advantage of the present invention is to make it easier to clean powder boxes and other equipment and thereby enable processing equipment to be quickly changed from one color to another color, e.g., quicker color changeover.

DESCRIPTION OF THE DRAWINGS

Other objects, features and advantages of the present invention will become more apparent from the following detailed description of preferred embodiments, the appended claims and the accompanying drawings in which:

DETAILED DESCRIPTION OF PREFERRED EMBODIMENTS

Figure 1:
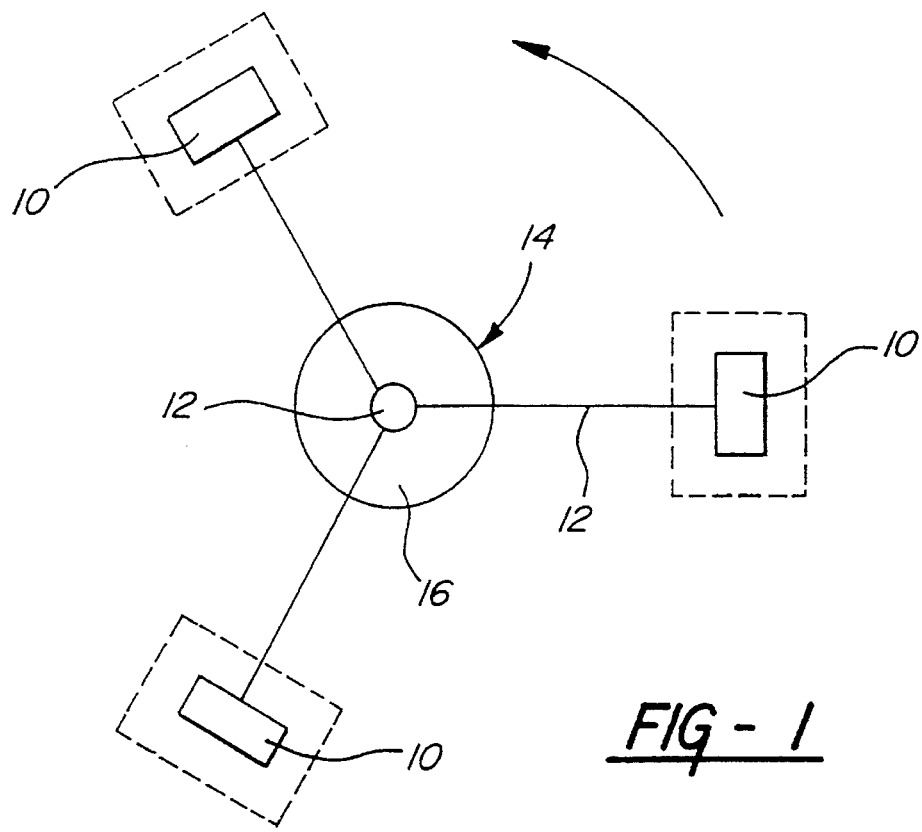
FIG. 1 is a diagrammatic view of apparatus used to practice a roto-casting process of the present invention.
Figure 2:
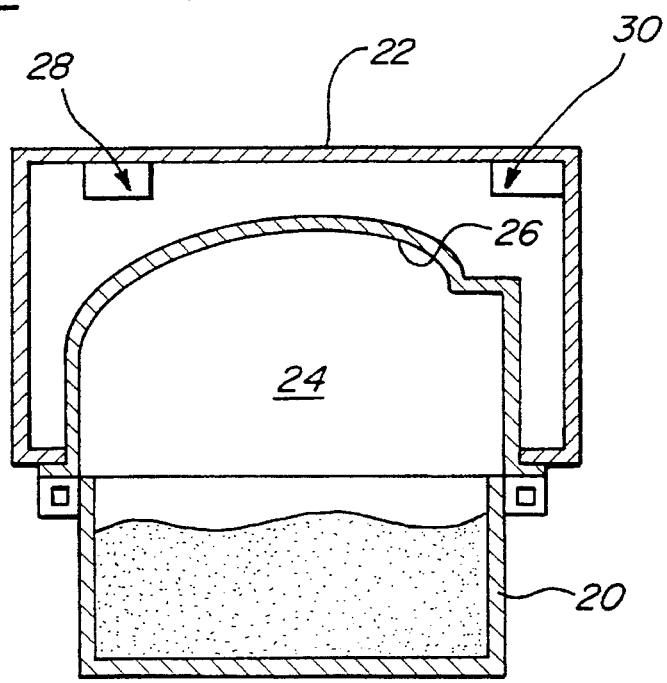
FIG. 2 is a diagrammatic view of apparatus used to practice a slush molding process of the present invention.

The following examples include suitable materials for microspheres of melt extruded thermoplastics:

EXAMPLE NO. 1

Melt extruded PVC resin with plasticizer(s), stabilizers, pigment, release agents and flow aids.

EXAMPLE NO. 2

Melt extruded thermoplastic material including anti-oxidants, pigments and high, medium and low molecular weight ranges of anyone of the following:

polypropylene polyethylene polystyrene epoxies alloyed PVC

The sizes of melt extruded thermoplastic microspheres of the present invention are in the weight ranges of 0.007" to 0.040". The molecular range for representative materials is as follows:

| Material Type | Molecular Weight |
| --- | --- |
| TPU | Formulations set forth in office file P-660, U.S. Ser. No. 319,614, hereby incorporated by reference. Includes polyols with 2000 to 5000 M.W. and could be as high as 20,000 M.W. |
| PVC | 50,000 to 150,000 |
| Polyethylene | 2000 to 5000 |
| Polypropylene | 40,000+ |

In accordance with another aspect of the invention, the aforesaid microspheres formed in the size range of 0.007" to 0.040" are suitable for use in roto-casting. In such process a predetermined charge of the materials is placed within a hollow mold 10 that is supported on an arm 12 of a centrifuge 14. The centrifuge 14 has a motor 16 that will drive the arm 12 to cause the charge of material to flow evenly across the inner surface of the mold. The mold 10 is heated to cause the thermoplastic microspheres to melt as they are flowed evenly across the inner surface to build-up a uniform thickness shell on the mold 10. The mold and shell are cooled and the mold 10 is opened to remove the shell as a finished part or a near net shape part for final finishing. The process includes the steps of providing thermoplastic microspheres formed by melt extruding materials as set forth above. One suitable example included 52.5% PVC resin; 31.5% plasticizers; 9.3% stabilizers; 1.5% pigment and 4.5% flow aids. The amount of different constituents that are used to form the melt extruded thermoplastic microspheres of the present invention will depend upon the part that is to be manufactured by either roto-casting, slush molding or other known powder casting processes in which thermoplastic particles are melted on a heated surface to form a skin or shell thereon. The resultant particles have a diameter of from 0.007" to 0.040". The process includes placing a charge of such microspheres corresponding to the weight of the finished product in a closed hollow heated mold and centrifugally and melt flowing the material into a shape corresponding to the heated mold surface; thereafter cooling the centrifugally molded part and removing it from the closed hollow heated mold.

In accordance with another aspect of the invention the aforesaid microspheres formed in the size range of 0.007" to 0.040" are suitable for use in slush molding. In such process an excess charge of the materials is placed in a charge or powder box 20. The box 20 is connected to a mold 22 having a cavity 24 formed in part by a casting surface 26 heated or cooled by a suitable heater 28 or air cooling system 30. Once the box 20 is connected to the mold 22, the box 20 and mold 22 are inverted so that the excess charge of materials is dumped into the mold cavity 24. Typical slush molding apparatus is set forth in U.S. Pat. Nos. 4,722,678; 4,878,827 and 5,046,941 all owned by the assignee of the captioned application. The aforesaid U.S. Patents include maintaining a static head of material over the layer of material that is dumped onto the casting surface 26 of the mold cavity 24. The heating system 28 provides heated air (other suitable heaters are suitable for use with the invention such as the hot oil heater of U.S. Pat. No. 4,389,177 or electrical heaters as shown in U.S. Pat. No. 4,979,888). The casting surface 26 is heated to cause the thermoplastic melt extruded microspheres to melt as they are flowed evenly across the casting surface 26 and compacted thereon by the static head of the overlying material. It has been found that this enables a wider range of microsphere sizes to be used for build-up of a uniform thickness shell on the casting surface 26 having low porosity that is below a visual threshold for holes in the skin. Visual threshold, for purposes of this application, is determined as follows:

A person with normal vision 20/20 at 20 feet with an acute angle of 5 minutes of arc (from the top of the letter to its bottom to the focal point meeting the eye) can discern a letter that is 8.7 mm high (0.3425"). A person with 20/15 vision can discern a letter 6.52 mm (0.2566") and a person with super vision 20/10 can discern a letter at 20 feet that is 4.35 mm (0.1712") high.

A person with 20/13 vision looking at a fine grid pattern from a distance of 16 inches would have a maximum resolvable separation ability of 0.35 mm (0.01379"). While there wasn't a reference for a closer distance, we theorized that at 8 inches a person with extremely acute vision may be able to discern a hole of 0.0068" in diameter.

The present invention produces skins that have porosity less than this threshold usually with fewer pores and diameters less than 0.003".

The mold cavity 24 is cooled by suitable air cooling or liquid cooling systems as shown in U.S. Pat. Nos. 4,621,994; 4,623,503 and 5,106,285, all owned by the assignee of the present application and incorporated by reference herein. The shell is concurrently cooled and the powder box and mold cavity 24 are separated so that the mold 22 is opened to remove the shell as a finished part or a near net shape part for final finishing. The process includes the steps of providing thermoplastic microspheres formed by melt extruding materials as set forth above. One suitable example included 52.5% PVC resin; 31.5% plasticizers; 9.3% stabilizers; 1.5% pigment and 4.5% flow aids and further having a diameter of from 0.007" to 0.040"; placing a charge of such microspheres greater than the weight of the finished product in a charge box and dumping the contents of the charge box into a mold cavity; maintaining a static head of the microspheres over a casting surface on the mold cavity; heating the casting surface to melt a layer of microspheres that contact the casting surface and flowing the material into a shape corresponding to the heated casting surface; thereafter cooling the molded part and removing it from the mold.

INDUSTRIAL APPLICABILITY

Industrial applicability of the aforesaid processes includes the ability to have continuous in-line compounding of the constituents in the mix/extrusion/molten stream steps upstream of the formation of the resultant microspheres.

Another industrial applicability of the aforesaid processes is that the lower molecular weight resins in the microspheres will reduce the process temperatures and will decrease cycle time in the roto-casting and slush molding of thin thermoplastic parts.

Another industrial applicability of the aforesaid processes is that such microspheres will lock the plasticizer component into the resin matrix material such that the resultant cast part can be formed with a uniform thickness without backside irregularities so as to improve shell weight control while reducing powder tackiness at higher summer time ambient conditions.

Still another industrial applicability of the invention is that it reduces the need for vibratory devices to maintain powder flow and as a consequence there is less tool wear which in turn increases tool life and make it easier to clean powder boxes and other equipment and thereby enable processing equipment to be quickly changed from one color to another color, e.g., quicker color changeover.

Still another industrial applicability is the formation of microspheres by mixing and blending plasticizers, polymers, and additives in a melt type extruder prior to spherizing the material in a liquid bath enables the use of solid plasticizers such as nitrile rubber that is used as a impact strength modifier to improve the low temperature strength properties of a part.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A process for manufacturing thin plastic shells comprising the steps of providing a predetermined charge of material made up of microspheres comprising blended thermoplastic resin and plasticizer with pigment additives that constitute less than 5% by weight of the blend; the microspheres having a smooth outer surface appearance at magnifications of 80 X and having an outside diameter in a range of 0.007" to 0.040"; providing a heated mold; placing the charge of microspheres into the heated mold; melt flowing the material into a shape of the thin plastic shell corresponding to the heated mold surface; thereafter cooling the thin plastic shell and removing the thin plastic shell from the mold, wherein the microspheres cause the thin plastic shell to be formed with low porosity and a uniform thickness without backside irregularities so as to improve shell weight control.

2. A process for manufacturing thin plastic shells comprising the steps of providing a predetermined charge of material made up of microspheres comprising blended thermoplastic resin and plasticizer with pigment additives that constitute less than 5% by weight of the blend; the microspheres having a smooth outer surface appearance at magnifications of 80 X and having an outside diameter in a range of 0.007" to 0.040"; providing a centrifugal mold; placing an amount of the predetermined charge of the microspheres into the centrifugal mold corresponding to a weight of the finished thin plastic shell to be removed from the mold; and centrifugally and melt flowing the material into a shape of the thin plastic shell corresponding to the heated mold surface; thereafter cooling the centrifugally molded thin plastic shell and removing the thin plastic shell from the mold, wherein the miscrospheres cause the thin plastic shell to be formed with low porosity and a uniform thickness without backside irregularities so as to improve shell weight control.

3. A process for manufacturing thin plastic shells comprising the steps of providing a predetermined charge of material greater than a weight of the thin plastic shell to be molded and comprised of microspheres including blended thermoplastic resin and pigment additives that constitute less than 5% by weight of the blend and wherein the microspheres have a smooth outer surface appearance at magnifications of 80 X and have an outside diameter in a range of 0.007" to 0.040"; providing a heated mold; placing the charge of microspheres into a powder box; joining the powder box to the heated mold; rotating the powder box to fill the heated mold with an amount of the predetermined charge of the material that imposes a static head on the material that rests on a heated casting surface of the mold; melt flowing the material across the heated casting surface into a shape of the thin plastic shell corresponding to the heated casting surface; removing excess material; and thereafter cooling and removing the finished thin plastic shell from the mold, wherein the microsphres cause the thin plastic shell to be formed with low porosity and a uniform thickness without backside irregularities so as to improve shell weight control.

4. A process for manufacturing thin plastic shells comprising the steps of providing a predetermined charge of material made up of microspheres having a smooth uniform diameter in a range of 0.007" to 0.040" and comprising blended thermoplastic resin and plasticizer with pigment additives that constitute less than 5% by weight of the blend and wherein the thin plastic shells are processed from the microspheres by slush molding the microspheres from a charge of the material larger than a weight of the thin plastic shell to be cast in a heated mold; providing the heated mold; placing the charge of microspheres into a powder box; joining the powder box to the heated mold; rotating the powder box to fill the mold with the charge of the material, which charge imposes a static head on the material that rests on a heated casting surface of the heated mold; melt flowing the material across the heated casting surface into a shape of the thin plastic shell corresponding to the heated casting surface; removing excess material; and thereafter cooling and removing the finished thin plastic shell from the mold, wherein the microspheres cause the thin plastic shell to be formed with low porosity and a uniform thickness without backside irregularities so as to improve shell weight control.

\* \* \* \* \*